United States Patent
Vergara

(10) Patent No.: US 7,766,095 B2
(45) Date of Patent: Aug. 3, 2010

(54) LINK ASSEMBLY FOR A TRACTOR HITCH

(75) Inventor: Daniel Vergara, Madrid (ES)

(73) Assignee: John Deere Iberica S.A., Madrid (ES)

( * ) Notice: Subject to any disclaimer, the term of this patent is extended or adjusted under 35 U.S.C. 154(b) by 0 days.

(21) Appl. No.: 12/363,214

(22) Filed: Jan. 30, 2009

(65) Prior Publication Data

US 2009/0194302 A1 Aug. 6, 2009

(30) Foreign Application Priority Data

Feb. 2, 2008 (DE) .............. 10 2008 007 299

(51) Int. Cl.
*A01B 59/06* (2006.01)
(52) U.S. Cl. ................. 172/439; 172/272
(58) Field of Classification Search ........ 172/272, 172/439
See application file for complete search history.

(56) References Cited

U.S. PATENT DOCUMENTS

| | | | | |
|---|---|---|---|---|
| 2,717,163 A | * | 9/1955 | Martin | 280/477 |
| 3,643,976 A | * | 2/1972 | Haupt et al. | 172/272 |
| 3,853,335 A | * | 12/1974 | Heckenkamp | 172/272 |
| D289,653 S | * | 5/1987 | Hamatani | D15/28 |
| 5,076,369 A | | 12/1991 | Herchenbach | |
| 5,327,978 A | * | 7/1994 | Bremner | 172/439 |
| 6,227,305 B1 | | 5/2001 | Sayer | |
| 6,267,023 B1 | | 7/2001 | Sayer | |
| 6,732,811 B1 | * | 5/2004 | Elliott | 172/445.1 |
| 7,658,569 B2 | * | 2/2010 | de Oliveira | 403/330 |

FOREIGN PATENT DOCUMENTS

| | | |
|---|---|---|
| CA | 1012402 | 6/1977 |
| DE | 39 38 419 | 3/1991 |
| DE | 198 49 061 | 10/1999 |
| DE | 198 49 070 | 10/1999 |

* cited by examiner

*Primary Examiner*—Robert E Pezzuto
*Assistant Examiner*—Jamie L McGowan

(57) ABSTRACT

The invention relates to a lower link assembly for a tractor hitch. The lower link assembly includes a first strut and a second strut. The first strut includes a channel at an end thereof and a hollow space defining first and second walls and adjacent to the channel. The second strut may be inserted into the channel. A locking element is associated with the hollow space for latching the second strut to the first strut, and may be moved between an unlocked position and a latching position. A spring pretensions the locking element in the latching position. A grip element is connected to the locking element, by means of which an operator may move the locking element into the unlocked position. The spring is biased to retain the locking element in the hollow space.

6 Claims, 4 Drawing Sheets

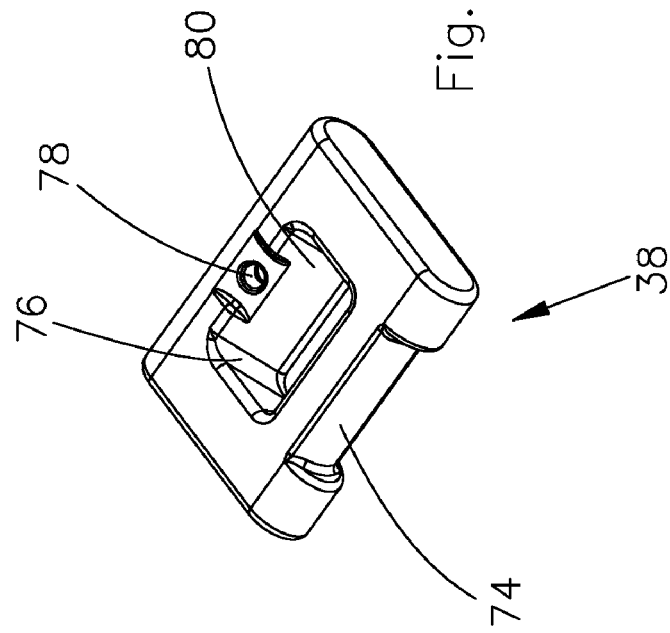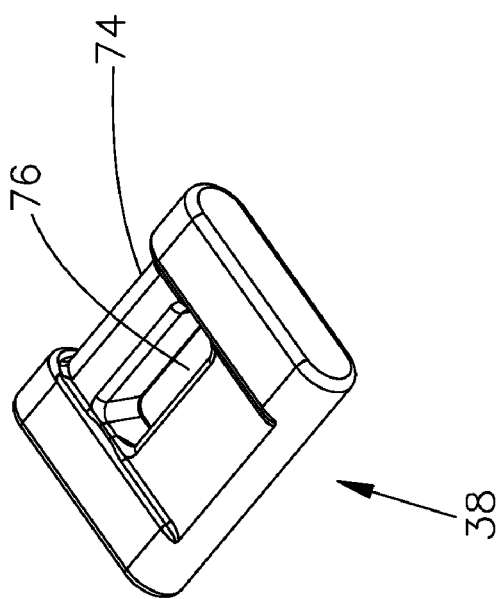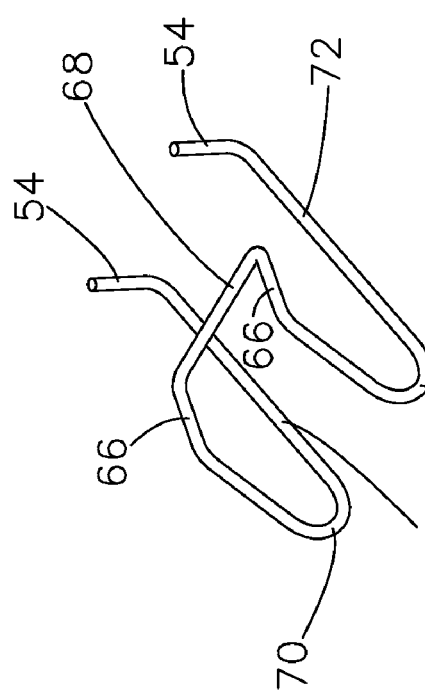

US 7,766,095 B2

LINK ASSEMBLY FOR A TRACTOR HITCH

FIELD OF THE INVENTION

The present invention relates to a lower link assembly for a tractor hitch.

BACKGROUND OF THE INVENTION

Links, including lower links, are used in tractors as components of three point hitches, in order to fasten implements to the tractor, such as for example manure spreaders, plows and other ground working implements. To facilitate the attachment of the implement to the tractor, two-part lower links are known which are constructed from two struts which are able to be telescoped relative to one another and separated from one another. The struts are provided, at one end, with ball joint eyes by which they may be fastened to associated points of the tractor and the implement. The struts are thus pushed into one another by reversing the tractor and when reaching a desired end position are fixed to one another by a locking device, so that the implement is then fixed to the tractor ready for operation. The locking device may be released again on completion of the operation.

Such a typical lower link is disclosed in U.S. Pat. No. 5,327,978. A first strut, which may be connected to the tractor, has a channel to the rear into which a second strut which may be connected to the implement may be inserted. In the region of the second strut, a saw tooth-like recess is incorporated. The first strut comprises in the region of the channel a pocket in which a locking plate is pivotably coupled by means of two coaxial pivot pins attached on both sides, which extend through bores in the locking plate and in the side wall of the pocket. The locking plate is pretensioned by means of a spiral spring, which extends between the outer face of the locking plate and the inner wall of the pocket, toward the channel. As a result, the locking plate is pressed into the recess by means of the spiral spring and locks the struts to one another. A knob is fastened to the locking plate at the side, which also extends through a slot in the side wall of the pocket and allows manual unlocking, by an operator gripping the knob and moving the locking plate therewith counter to the pretensioning of the spring, out of the recess of the second strut. In similar embodiments of this lower link currently on the market, the spiral spring comprises a spring coil arranged coaxially to the pivot pin and two limbs, of which one bears against the locking plate and the other bears against the inner wall of the pocket.

In this arrangement, it is regarded as a drawback that the mounting of the locking mechanism is relatively complicated, as the locking plate has to be moved by the spiral spring through the channel into the interior of the pocket and fixed there by inserting the pins.

U.S. Pat. No. 2,717,163 discloses a coupling arrangement for connecting a tractor to an attachment or trailer which also comprises two telescopic struts, which may be fastened to one another by a locking arrangement. A locking plate cooperating with a projecting shoulder of the second strut is arranged inside a housing connected to the first strut. The end of the locking plate facing the second strut is pivotably attached between the upper face and the rear face of the housing and a pin arranged thereunder in a U-shaped pocket. The other end of the locking plate is provided with a blind threaded portion, into which a screw is screwed, and which extends upwardly through a bore in the housing. A leaf spring is riveted to the housing at one end, and at the other end is connected to the screw head and pretensions the locking plate downwardly, i.e. toward the second strut.

In this case, it is regarded as a drawback that the spring is located outside the housing and accordingly is unprotected against soiling. The attachment of the spring is also very time-consuming due to the rivets and the connection to the screw head.

SUMMARY OF THE INVENTION

Accordingly, an object of this invention is to provide a link assembly which is simple to mount.

This and other objects are achieved according to the invention by a link assembly for a tractor hitch which includes a first strut and a second strut. At the end of the first strut are arranged a channel and a hollow space adjacent to the channel. The second strut can be inserted into the channel and has a recess. A locking element used for latching the second strut to the first strut is movably attached in the hollow space. The locking element can be moved to an unlocked position in which it is located inside the hollow space and in which the second strut may be displaced in the channel, and to a latching position, in which it penetrates the channel and locks the second strut in the channel, by extending into the recess, when the second strut is located in the correct position and orientation in the channel. A spring is biased to hold the locking element in the latching position. The spring comprises a first limb bearing against a wall defining the hollow space and a second limb bearing against the locking element. Finally, a grip element is provided which extends through an opening in a wall defining the hollow space and is connected to the locking element. By means of the grip element, an operator may move the locking element into the unlocked position, by gripping and moving the locking element such that the locking element passes out of the recess in the second strut into the hollow space and thus releases the second strut. It is proposed that the spring is biased so that it holds the locking element in the hollow space.

In this manner, the spring is not only used to pretension the locking element toward the latching position, but is additionally used to retain the locking element in the hollow space. As a result, separate elements, such as pivot pins or the like, are not necessary for movably mounting the locking element inside the hollow space. The time required for mounting the locking element in the hollow space is substantially reduced relative to the prior art, as the attachment of separate elements for retaining the locking element in the hollow space is dispensed with. Only the springs have to be moved into their position in the hollow space.

In one embodiment, the first limb of the spring bears against a first wall of the hollow space, whilst a part of the spring located between the limbs bears against a second wall of the hollow space opposing the first wall of the hollow space. The spring is accordingly under tension between the two walls and retains itself and the locking element in the hollow space. However, it might also be conceivable that, instead of the part of the spring located between the limbs of the spring, the locking element pretensioned by the spring against the second wall (or the locking element and the region) bears against the second wall. Preferably, the first wall and the second wall of the hollow space are spaced apart from one another in the longitudinal direction of the channel, i.e. extend transversely to the direction of insertion of the second strut. However, it might also be possible for the walls to be spaced apart from one another in the transverse direction of the channel.

The spring may be used as a pivot bearing for the locking element, which may be achieved by the first and the second limbs of the spring being connected by a bent region which encircles the locking element in a semicircular manner (or by any larger angle which may also include a plurality of loops).

The object of the spring is to pretension the locking element in the latching position. The attachment thereof may be facilitated by the second limb thereof coming to bear against a wall of a central opening of the locking element. This wall is preferably chamfered, in order to avoid greater bending of the spring.

To increase the stability and the retaining force, it is proposed that the spring is made up of first and second limbs which are connected to one another. The two springs are respectively associated with a further side of the locking element.

The grip element may extend through an opening in a front wall extending parallel to the plane of the locking element, as in U.S. Pat. No. 2,717,163, so that the operator pulls the grip element out of the hollow space, in order to move the locking element into the unlocked position, or it extends through a slot in a side wall of the channel and the hollow space, as in U.S. Pat. No. 5,327,978.

BRIEF DESCRIPTION OF THE DRAWINGS

FIG. 5 is a perspective view of the spring;

FIG. 6 is an upper perspective view of the locking element; and

FIG. 7 is a lower perspective view of the locking element.

DESCRIPTION OF THE PREFERRED EMBODIMENT

Figure 1:
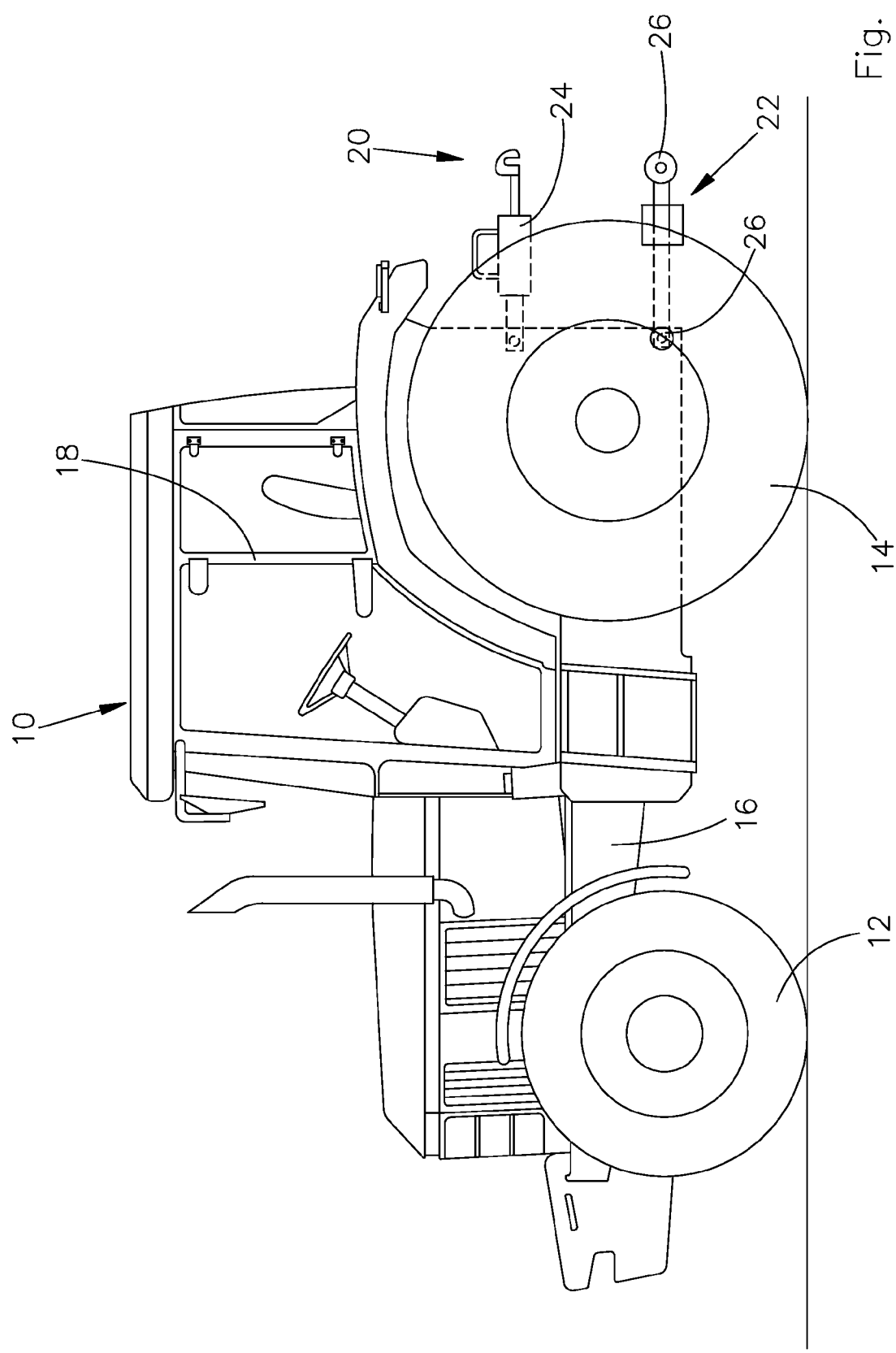
FIG. 1 is a side view of an agricultural utility vehicle which has a three point hitch with a lower link.

Referring to FIG. 1, an agricultural utility vehicle, in the form of a tractor 10, includes a frame 16 which is supported on front, steerable wheels 12 and rear drivable wheels 14, and which carries a cab 18 with an operator work station arranged therein. To the rear of the frame 16 (or an attachment connected thereto), a three point attachment device or hitch 20 is fastened with two lower link assemblies 22 (of which only one may be seen) and a hydraulic upper link 24 attached thereabove. The lower link assemblies 22 are provided at both ends with ball joint eyes 26, which are used for pivotably movably securing to the tractor (or another self-propelled machine) and/or to an implement to be attached or to be carried by the two lower links 22 arranged in parallel on the tractor. The lower link assemblies 22 are, in a manner known per se, angled inwardly and/or outwardly in the vicinity of the ball joint eyes 26, as is shown in FIG. 3 in the example of the rear end of the lower link assembly 22.

Figure 2:
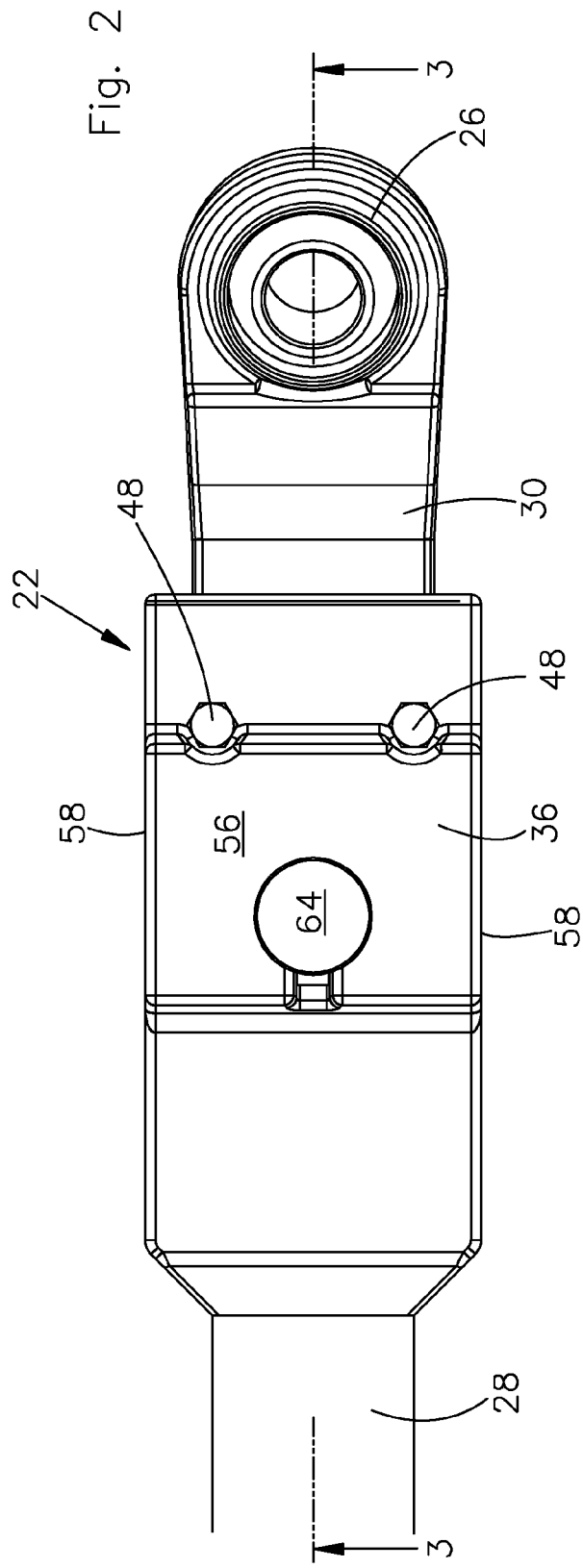
FIG. 2 is a side view of the rear region of the lower link of FIG. 1.
Figure 3:
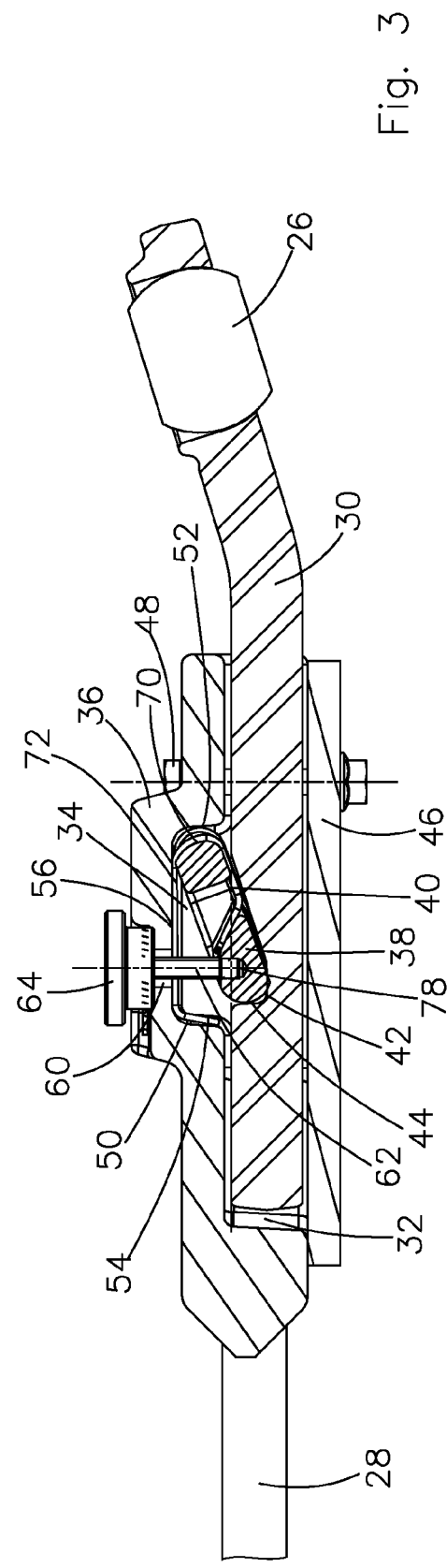
FIG. 3 is a sectional view along line 3-3 of FIG. 2.
Figure 4:
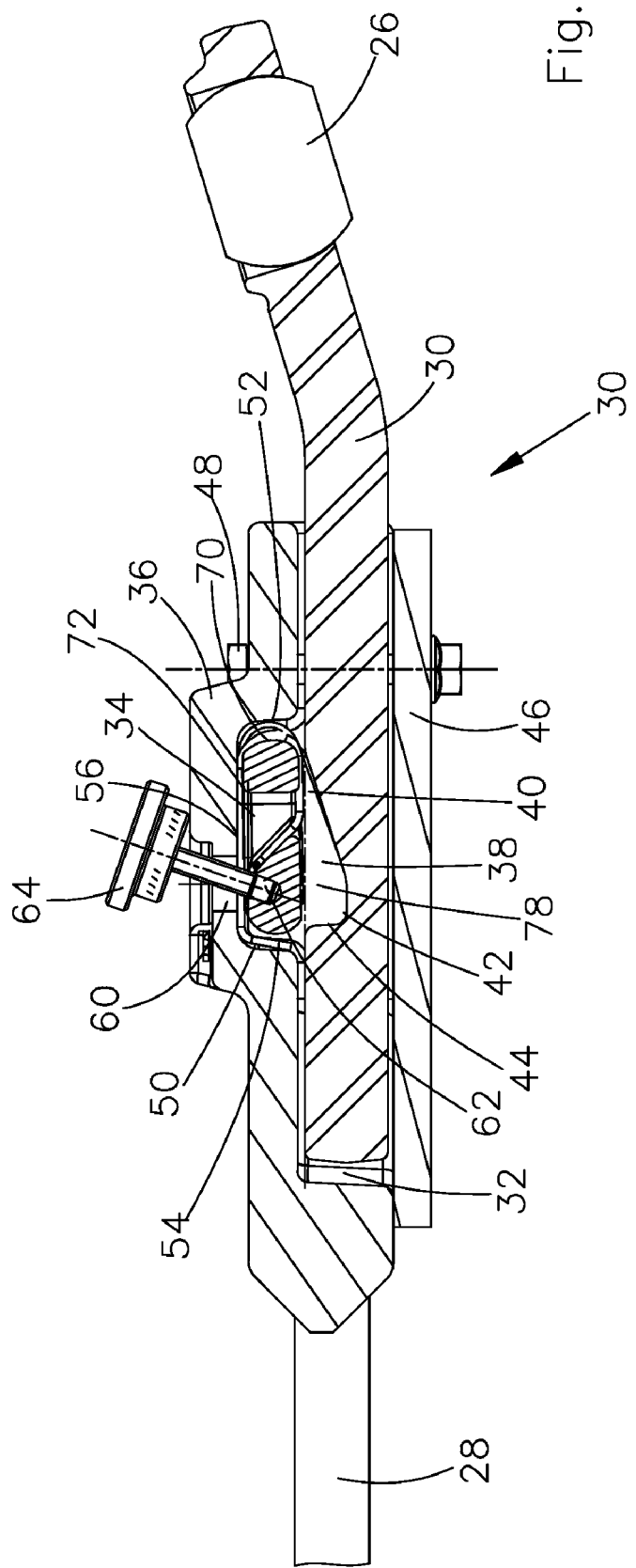
FIG. 4 is a sectional view similar to FIG. 3, but showing an unlocked position.

As may be seen most clearly with reference to FIGS. 2 to 4, a lower link assembly 22 is respectively made up of a first front strut 28 and a second rear strut 30. The second strut 30 is able to be separated from the first strut 28. To this end, at the end of the first strut 28 a channel 32 is provided in which the second strut 30 may be inserted. A hollow space 36 adjacent to the channel 32 in a housing 34 enclosing the channel 32 to one side receives a locking element 38 which is used for latching the second strut 30 in the channel 32, by being pressed by a spring 40 into a saw tooth-shaped recess 42 of the second strut 30 and at the front face bears against a front shoulder 44 of the recess 42. On the side located opposite the housing 36, the channel 32 is covered by a cover plate 46 which at the end illustrated to the left in FIG. 3, facing the ball joint eye 26 of the first strut 28, is welded to the housing 34 and at the other end facing the second strut 30 is connected to the housing 36 by two screws 48 arranged on both sides of the channel 32. The housing 36 may be designed as a welded assembly or as a cast part and is welded to the front part of the strut 28.

The hollow space 34 comprises a first wall 50 which extends at right angles away from the channel 32 and faces the end of the housing 36 illustrated to the left, and adjacent to the ball joint eye 26 of the first strut 28. A second wall 52 of the hollow space 34 also extends at right angles away from the channel 32 and faces the second strut 30. A front wall 56 outwardly defines the hollow space 34 between the two walls 50 and 52. The front wall 56 extends in the longitudinal direction of the channel 32 and in the transverse direction thereto between two side walls 58 of the housing 36 (see FIG. 2). A bore or opening 60 in the front wall 56 is penetrated by a cylindrical pin 62 of a grip element 64. The pin 62, provided at the end with a thread, is screwed to an associated blind threaded bore 78 of the locking element 38. The grip element 64 allows an operator to move the locking element 38 from the latching position shown in FIG. 3, in which it is pretensioned by the spring 40, into an unlocked position, as shown in FIG. 4, in order to be able to remove the second strut 30 from the channel.

The spring 40 is shown in FIG. 5 in a perspective view. It comprises two first limbs 54, two second limbs 66 which are connected to one another by a connecting region 68 and two regions 70 adjoining the second limbs 66 bent in the resting position by approximately 180°, to which in turn straight regions 72 are adjoined, to which finally the first limbs 54 are adjoined, angled by slightly less than 90°. In the fully mounted position of the lower link assembly 22, as is shown in FIGS. 3 and 4, the first limbs 54 bear against the first wall 50 of the hollow space 34. The straight regions 72 bear against the front wall 56 whilst the curved regions 70 bear against the second wall 52 of the hollow space 34. The locking element 38 shown in FIGS. 6 and 7 comprises an outer recessed region 74 in which the bent regions 70 of the spring 40 are received, and a central opening 76 with a wall 80 against which the limbs 66 and the connecting region 68 of the spring 40 bear. The two symmetrical parts of the spring 40 are associated with the two sides of the locking element 38. As the spring 40 is dimensioned such that the first limbs 54 and the bent regions 70, are biased to bear against the walls 50, 52 of the hollow space 34, the springs 40 and the locking element 38 are retained by the force of the spring 40 in the hollow space 34. The spring 40, in turn, forms by means of the bent regions 70 a pivot bearing for the locking element 38, which is pivotable in this manner between the positions according to FIGS. 3 and 4.

The mounting of the locking element 38 in the hollow space 34 takes place such that initially the spring 40 is positioned on the locking element 38, so that the bent regions 70 in the recessed region 74 and the first limbs 54 as well as the connecting limb 68 come to bear against the central wall 80 of the central opening 76. Then the spring 40 and the locking element 38 are inserted into the channel 32 and, by means of a suitable tool, the spring 40 is pushed into the hollow space 34, until the straight regions 72 bear against the front wall 56 and the first limbs 54 and the bent regions 70 are under tension against the walls 50, 52. Then the pin 62 of the grip element 64 is screwed into the blind threaded bore 78.

Taking the above into account, the function of the lower link assembly 22 is obvious: proceeding from the latching position of the locking element 38 shown in FIG. 3, in which it connects the second strut 30 to the first strut 28, by bearing against the shoulder 44 of the recess 42, the locking element 38 may be pivoted by a manual movement of the grip element 64 counter to the force of the spring 40 into the unlocked position according to FIG. 4, in which the second strut 30 may be pulled out of the channel 32. To be attached again, the second strut 30 may be introduced into the channel 32. By manual insertion or by reversing the tractor 10, the second strut 30 may be introduced sufficiently far into the channel 32 that the locking element 38, by the pretensioning of the spring 40, penetrates the recess 42 and the situation shown in FIG. 3 is reached.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A link assembly for a hitch for a tractor, comprising:
a first strut, the first strut having a channel at an end thereof and a hollow space adjacent to the channel, the hollow space being defined by a first wall, a second wall opposite the first wall and a third wall between the first and second walls;
a second strut, the second strut having a recess and being insertable into the channel;
a locking element mounted in the hollow space for latching the second strut to the first strut, the locking element being movable to an unlocked position in which the locking element is located inside the hollow space and the second strut may be displaced in the channel, and the locking element being movable to a latching position in which it penetrates the channel and in which the second strut is located in the channel and locks the second strut therein, by extending into the recess;
a spring which pretensions the locking element in the latching position, the spring comprising a first limb bearing against the first wall and a second limb bearing against the locking element, the spring being biased to retain the locking element in the hollow space, a part of the spring between the limbs extending through an opening in the locking element, the spring having a bent region which is wrapped around an end of the locking element, which engages the second wall and which forms a pivot bearing between the end of the locking element and the second wall; and
a grip element extending through an opening in the third wall and connected to the locking element, by means of which an operator may move the locking element into the unlocked position.

2. The link assembly of claim 1, wherein:
the first and second walls extend transversely to a direction of insertion of the second strut.

3. The link assembly of claim 1, wherein:
the first limb and the second limb of the spring are connected to one another by a bent region which encloses a part of the locking element.

4. The link assembly of claim 1, wherein
the second limb of the spring bears against a central wall of a central opening of the locking element.

5. A link assembly for a hitch for a tractor, comprising:
a first strut having a channel formed therein and a hollow space adjacent to the channel, the hollow space being defined by a first wall, a second wall opposite the first wall and a third wall extending between the first and second walls;
a second strut having a recess and being insertable into the channel;
a locking element mounted in the hollow space, the locking element being movable to a latching position wherein it extends into the channel and into the recess to latch the second strut to the first strut, and the locking element being movable to an unlocked position in which the locking element is received by the hollow space to permit removal of the second strut from the channel;
a operator graspable grip element extending through an opening in the third wall and connected to the locking element; and
a spring having a first limb which engages the first wall, a second limb which engages the locking element and a third limb which engages the second wall and which is between the first and second limbs, the spring and the hollow space cooperating so that when the locking element is in its unlocked position, the engagement of the spring with the first and second walls causes the spring to be biased to hold the locking element in the unlocked position, and when the locking element is in its latching position the spring is biased to hold the locking element in the latching position.

6. The link assembly of claim 5, wherein:
the third limb of the spring is wrapped around an end of the locking element and forms a pivot bearing between the end of the locking element and the second wall of the hollow space.

* * * * *